United States Patent
Chae et al.

(10) Patent No.: US 8,406,754 B2
(45) Date of Patent: Mar. 26, 2013

(54) APPARATUS AND METHOD FOR BEAMFORMING USING SECTOR COMMON ANTENNA IN WIRELESS COMMUNICATION SYSTEM

(75) Inventors: Heon-Ki Chae, Seongnam-si (KR); Keun-Chul Hwang, Seongnam-si (KR); Byoung-Ha Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 940 days.

(21) Appl. No.: 12/072,633

(22) Filed: Feb. 27, 2008

(65) Prior Publication Data

US 2008/0207194 A1      Aug. 28, 2008

(30) Foreign Application Priority Data

Feb. 28, 2007 (KR) .................. 10-2007-0020017

(51) Int. Cl.
   *H04W 4/00* (2009.01)
(52) U.S. Cl. .................. 455/422.1; 455/562.1; 455/446; 455/252; 455/429; 455/561; 455/65; 455/12.1; 455/13.3; 370/479; 370/252; 370/280; 370/335; 370/342; 370/316; 370/465; 370/536
(58) Field of Classification Search ............... 455/562.1, 455/561, 575.7, 65, 101, 25, 522, 277.1, 455/422.1, 446, 252, 429, 12.1, 13.3; 370/342, 370/464, 479, 252, 280, 335, 316, 465, 536
See application file for complete search history.

(56) References Cited

U.S. PATENT DOCUMENTS

| | | | | |
|---|---|---|---|---|
| 5,585,803 | A * | 12/1996 | Miura et al. .................. | 342/372 |
| 6,466,166 | B2 * | 10/2002 | Nakagawa .................... | 342/378 |
| 6,493,379 | B1 * | 12/2002 | Tanaka et al. ................. | 375/150 |
| 6,529,745 | B1 * | 3/2003 | Fukagawa et al. ......... | 455/562.1 |
| 6,850,190 | B2 * | 2/2005 | Ryu et al. ...................... | 342/377 |
| 6,895,253 | B1 * | 5/2005 | Carloni et al. ................ | 455/506 |
| 7,006,849 | B2 * | 2/2006 | Li et al. ...................... | 455/562.1 |
| 7,428,268 | B2 * | 9/2008 | Shen et al. .................... | 375/267 |
| 7,643,438 | B2 * | 1/2010 | Lee et al. .................... | 370/310.2 |
| 2001/0048389 | A1 * | 12/2001 | Nakagawa .................... | 342/378 |
| 2003/0236108 | A1 * | 12/2003 | Li et al. ...................... | 455/562.1 |
| 2005/0192058 | A1 * | 9/2005 | Jung et al. .................. | 455/562.1 |
| 2008/0075033 | A1 * | 3/2008 | Shattil .......................... | 370/328 |

FOREIGN PATENT DOCUMENTS

| | | |
|---|---|---|
| KR | 1020040000669 A | 1/2004 |
| KR | 1020040008750 A | 1/2004 |
| KR | 1020040056991 A | 7/2004 |
| KR | 1020050063620 A | 6/2005 |

* cited by examiner

*Primary Examiner* — Joseph Arevalo

(57) ABSTRACT

An apparatus and method for beamforming in a wireless communication system are provided. The base station apparatus includes a calculator, a plurality of formers, and a plurality of adders. The calculator calculates a beam coefficient considering interference to a neighbor sector to be applied to transmission signals to mobile stations. The plurality of formers performs beamforming for a transmission signal to each mobile station within a corresponding sector using the beam coefficient. The plurality of adders adds the sector-based beamformed signals each provided from the plurality of formers, on a per-transmission-antenna basis.

20 Claims, 6 Drawing Sheets

+ CINR < 0dB
o 0dB≤ CINR <5dB
△ 5dB≤ CINR <10dB
● 10dB≤ CINR <15dB

✱ 15dB≤ CINR <20dB
■ 20dB≤ CINR <25dB
□ 25dB≤ CINR

US 8,406,754 B2

APPARATUS AND METHOD FOR BEAMFORMING USING SECTOR COMMON ANTENNA IN WIRELESS COMMUNICATION SYSTEM

CROSS-REFERENCE TO RELATED APPLICATION(S) AND CLAIM OF PRIORITY

This application claims priority under 35 U.S.C. §119(a) to a Korean Patent Application filed in the Korean Intellectual Property Office on Feb. 28, 2007 and assigned Serial No. 2007-20017, the contents of which are herein incorporated by reference.

TECHNICAL FIELD OF THE INVENTION

The present invention relates generally to beamforming using a plurality of antennas in a wireless communication system, and in particular, to an apparatus and method for beamforming considering inter-sector interference in a wireless communication system.

BACKGROUND OF THE INVENTION

With the advent of the recent wireless multimedia era, the necessity to transmit a large capacity of data at a high speed over radio channels increases rapidly. Large transmission output and transmission bandwidth compared to general data transmission are required for high-speed data transmission. Thus, there is needed a method for reducing an interference signal and efficiently transmitting a desired signal to perform high-speed communication. One of alternatives for reducing an interference signal and guaranteeing a high reception power is a smart antenna technology, that is, a beamforming technology.

According to conventional beamforming, a Base Station (BS) divides a cell into a predetermined number of sectors and performs beamforming in each of the sectors separately. Thus, the BS has to include antennas on a per-sector basis by the number necessary for beamforming. For instance, if 4 antennas are used for beamforming, the BS has an antenna construction of FIG. 1. In FIG. 1, the whole of 12 antennas of the BS are classified into alpha ($\alpha$) sector antennas, beta ($\beta$) sector antennas, and gamma ($\gamma$) sector antennas and used for beamforming for each sector. If beamforming is, for example, performed for an arbitrary mobile station (MS) located in an alpha ($\alpha$) sector, a beam coefficient used is expressed in Equation 1 below:

$$W_{60} = (H_d^\alpha)^H \quad (1)$$

Here, $$H_d^\alpha = [h_d^{\alpha ant\,1} \ldots h_d^{\alpha ant\,N}]$$

where $W_\alpha$ is the beam coefficient for sector $\alpha$, and $h_d^{\alpha ant\,N}$ is the channel for antenna N in sector $\alpha$.

As noted in Equation 1, the base station (BS) considers only the channel in the alpha sector when performing the beamforming for the MS located in the alpha sector. Thus, upon beamforming, the BS does not control interference toward a neighbor sector and therefore, has to reduce a magnitude of a beamforming signal directing to a sector boundary. That is, the beamforming is divided and performed on a per-sector basis respectively and therefore, there is a drawback that as shown in FIG. 1, a magnitude of a beamformed signal directing to a sector boundary is reduced compared to a magnitude of a beamformed signal directing to a sector center. Because of this, an MS located at the sector boundary obtains a low beamforming gain. Also, there is a drawback that the BS gets complex more in construction because the BS has a plurality of antennas on a per-sector basis.

SUMMARY OF THE INVENTION

To address the above-discussed deficiencies of the prior art, it is a primary object of the present invention to substantially solve at least the above problems and/or disadvantages and to provide at least the advantages below. Accordingly, one aspect of the present invention is to provide an apparatus and method for beamforming not inducing inter-sector interference in a wireless communication system.

Another aspect of the present invention is to provide an apparatus and method for beamforming using common antennas with no sector division in a wireless communication system.

The above aspects are achieved by providing an apparatus and method for beamforming in a wireless communication system.

According to one aspect of the present invention, there is provided a base station (BS) apparatus having a plurality of antennas in a wireless communication system. The BS apparatus includes a calculator, a plurality of formers, and a plurality of adders. The calculator calculates a beam coefficient considering interference to a neighbor sector to be applied to transmission signals to mobile stations. The plurality of formers performs beamforming for a transmission signal to each mobile station (MS) within a corresponding sector using the beam coefficient. The plurality of adders adds the sector-based beamformed signals each provided from the plurality of formers, on a per-transmission-antenna basis.

According to another aspect of the present invention, there is provided a beamforming method of a BS in a wireless communication system. The method includes calculating a beam coefficient considering interference to a neighbor sector to be applied to transmission signals to mobile stations; performing beamforming for a transmission signal to each MS within a corresponding sector using the beam coefficient; and adding the sector-based beamformed signals on a per-transmission-antenna basis.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A technology for performing beamforming to remove inter-sector interference according to the present invention is described below.

First, the idea of the present invention for performing beamforming to remove inter-sector interference is described briefly.

Figure 1:
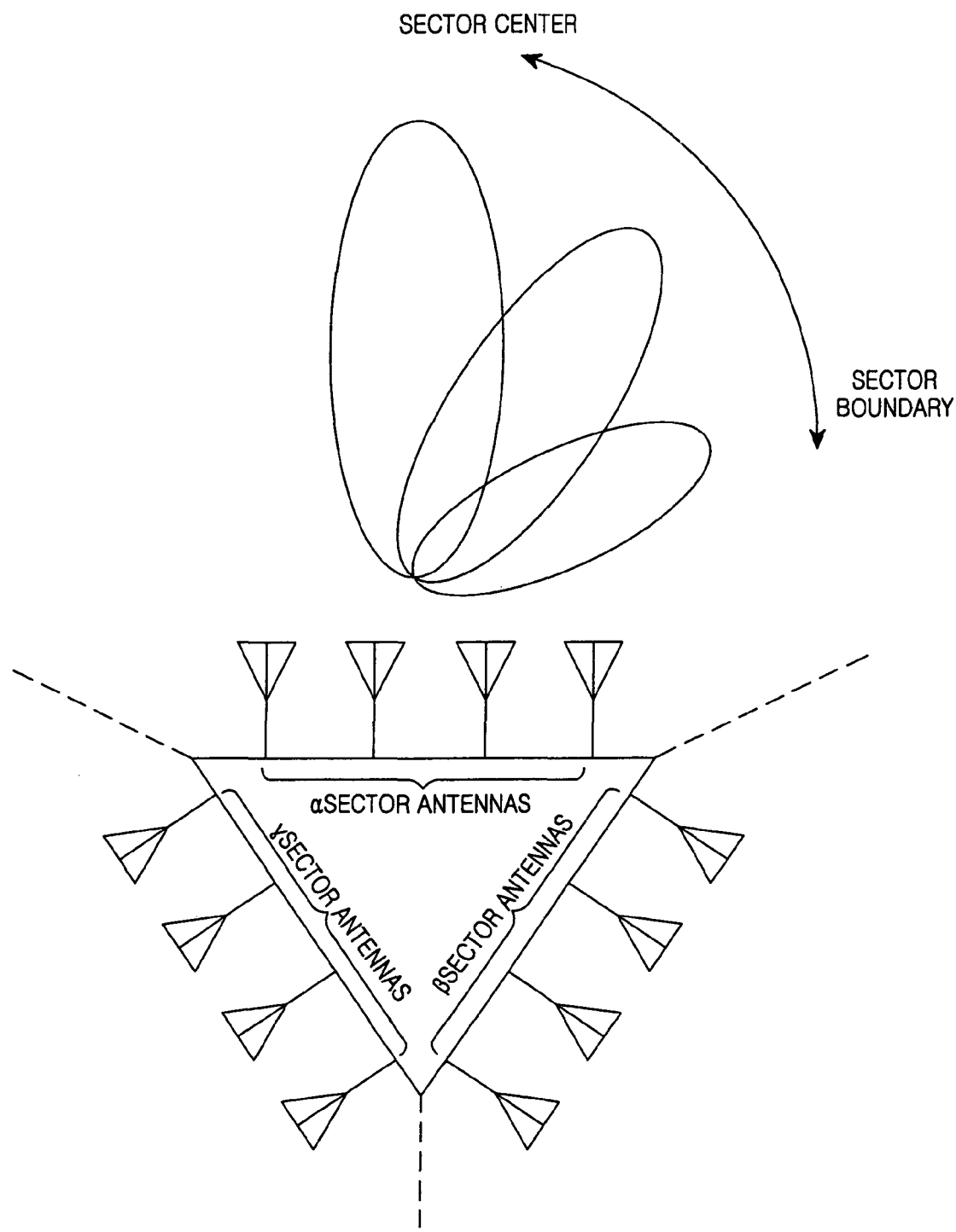
FIG. 1 is a diagram illustrating an antenna array of a BS in a wireless communication system according to the conventional art.
Figure 2:
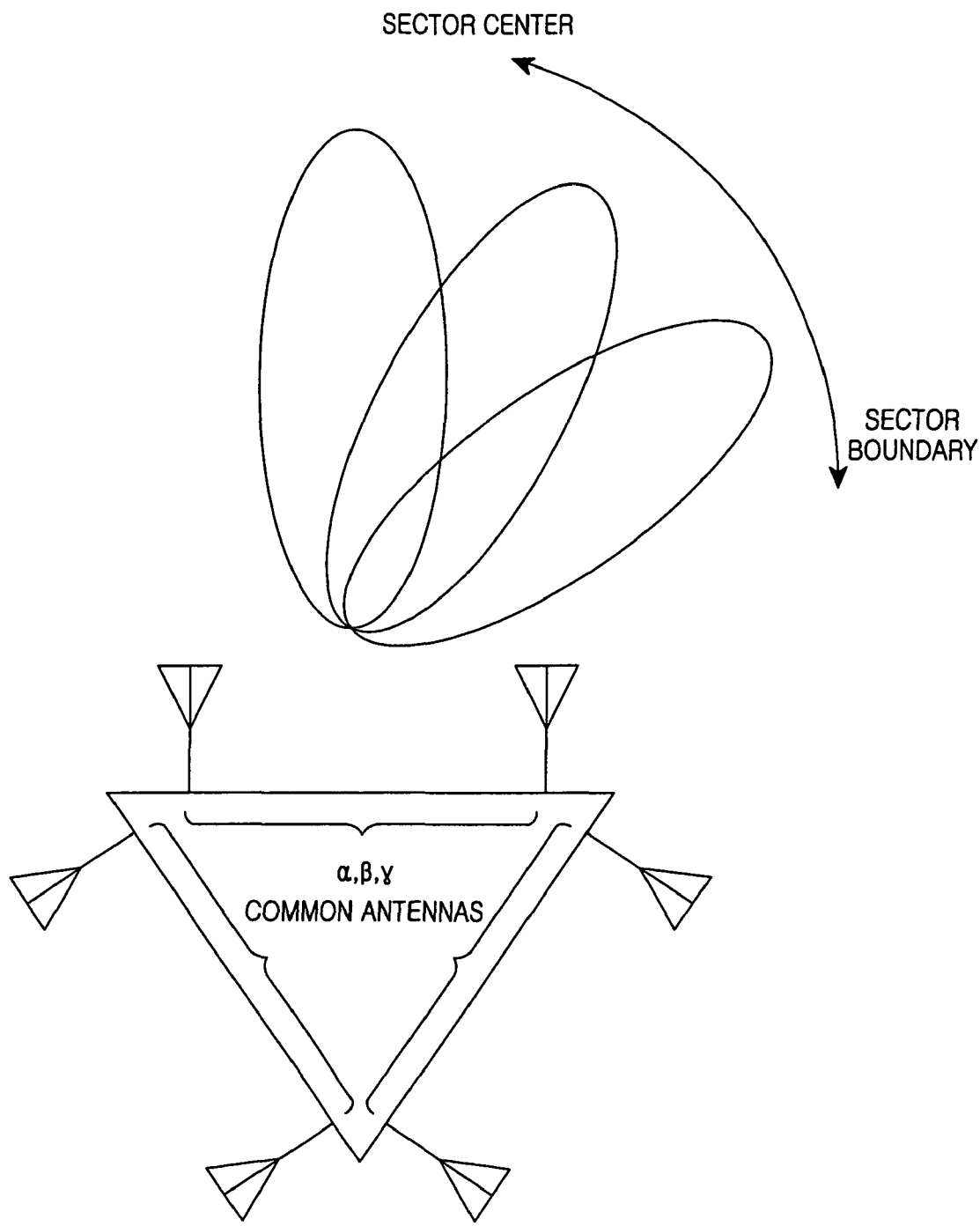
FIG. 2 is a diagram illustrating an antenna array of a BS in a wireless communication system according to the present invention.

Conventional beamforming is performed on a per-sector basis and therefore, a beamforming gain gets lower as a mobile station (MS) gets close to a sector boundary. Accordingly, a base station (BS) according to the present invention does not divide, on a per-sector basis, antennas used for beamforming as shown in FIG. 2. In other words, all the BS antennas are commonly used at the time beamforming is performed for each sector. That is, when performing beamforming for a specific sector, the BS can control interference directed to a neighbor sector by using together antennas of the neighbor sector having provided only an interference signal. Owing to this, the BS can make a signal of a relatively constant magnitude for all positions within a sector. Also, the BS performs beamforming for each sector using the same antennas, thereby reducing the total number of antennas essential to the BS.

Construction and operation of a BS to perform beamforming in such a manner are described below in detail with reference to the accompanying drawings.

Figure 3:
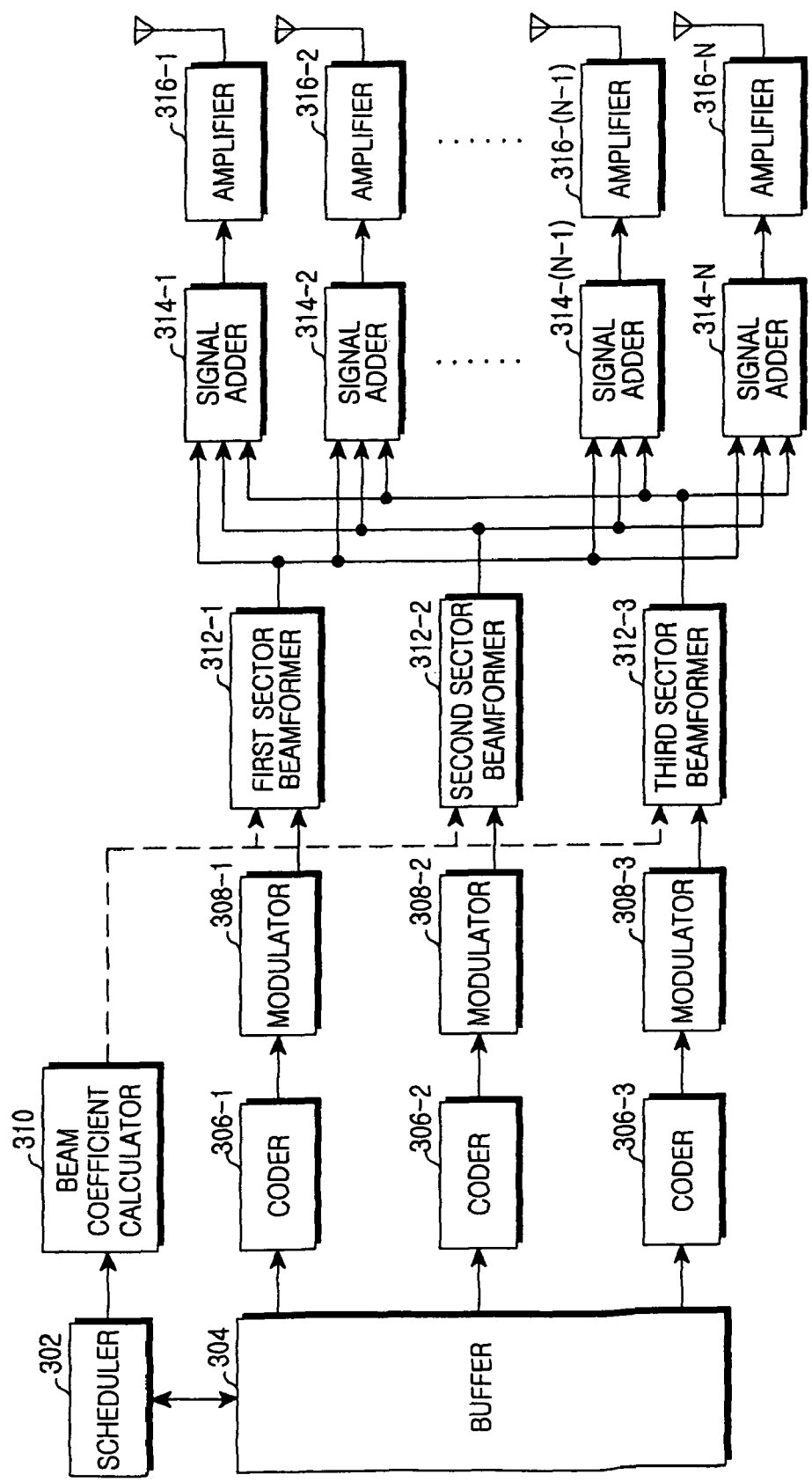
FIG. 3 is a block diagram illustrating a construction of a BS in a wireless communication system according to the present invention.

FIG. 3 is a block diagram illustrating a construction of a BS in a wireless communication system according to the present invention.

As shown in FIG. 3, the BS includes a scheduler 302, a buffer 304, a plurality of coders 306-1 to 306-3, a plurality of modulators 308-1 to 308-3, a beam coefficient calculator 310, a first sector beamformer 312-1, a second sector beamformer 312-2, a third sector beamformer 312-3, a plurality of signal adders 314-1 to 314-N, and a plurality of amplifiers 316-1 to 316-N.

The scheduler 302 performs scheduling to transmit data to mobile stations. The scheduler 302 performs scheduling without sector division and provides the scheduling result to the buffer 304 and the beam coefficient calculator 310. The buffer 304 stores data to be transmitted to the mobile stations and outputs corresponding data to a coder of a corresponding sector according to the scheduling result of the scheduler 302.

The plurality of coders 306-1 to 306-3 each are constructed on a per-sector basis and perform channel coding of data provided from the buffer 304 according to a corresponding scheme. The plurality of modulators 308-1 to 308-3 converts the coded bit streams provided from the plurality of coders 306-1 to 306-3 into complex symbols by modulating coded bit streams according to a corresponding scheme.

The beam coefficient calculator 310 calculates a beam coefficient for each MS. The beam coefficient calculator 310 receives the scheduling result from the scheduler 302 and calculates a beam coefficient minimizing interference to a neighbor sector. For example, in the case of taking an MS located in a sector α into consideration, the beam coefficient calculator 310 calculates a beam coefficient as in Equation 2 below:

$$W_\alpha = ((H_i^\alpha)^H H_i^\alpha + \sigma_\alpha^2 I)^{-1} (H_d^\alpha)^H \quad (2)$$

Here, $$H_d^\alpha = [h_d^{\alpha\,ant\,1} \ldots h_d^{\alpha\,antN}]$$

$$H_i^\alpha = [h_i^{\alpha\,ant\,1} \ldots h_i^{\alpha\,antN}]$$

where $W_\alpha$ is the beam coefficient vector for sector α, $h_i^{\alpha\,antN}$ is the interference channel for antenna N in sector α, $H_d^{\alpha\,antN}$ is the channel for antenna N in sector α, $\sigma_\alpha^2$ is the interference and noise power for sector α, and I is a unit matrix.

The calculated beam coefficient is a vector having elements by the number of the total antennas of the BS and is provided to each of the plurality of beamformers 312-1 to 312-3 responsible for a corresponding sector.

The first, second, and third sector beamformers 312-1, 312-2, and 312-3 beamform a signal to be transmitted to an MS within a corresponding sector. That is, the first sector beamformer 312-1, the second sector beamformer 312-2, and the third sector beamformer 312-3 perform beamforming by multiplying a beam coefficient provided from the beam coefficient calculator 310 by a signal provided from a corresponding modulator among the plurality of modulators 308-1 to 308-3. The beamformed signals are classified on a per-transmission-antenna basis and outputted to the plurality of signal adders 314-1 to 314-N, respectively.

The plurality of signal adders 314-1 to 314-N are constructed on a per-transmission-antenna basis and add signals provided from the first sector beamformer 312-1, the second sector beamformer 312-2, and the third sector beamformer 312-3. The plurality of amplifiers 316-1 to 316-N amplifies signals provided from the plurality of signal adders 314-1 to 314-N and transmits the amplified signals through corresponding transmission antennas.

Figure 4:
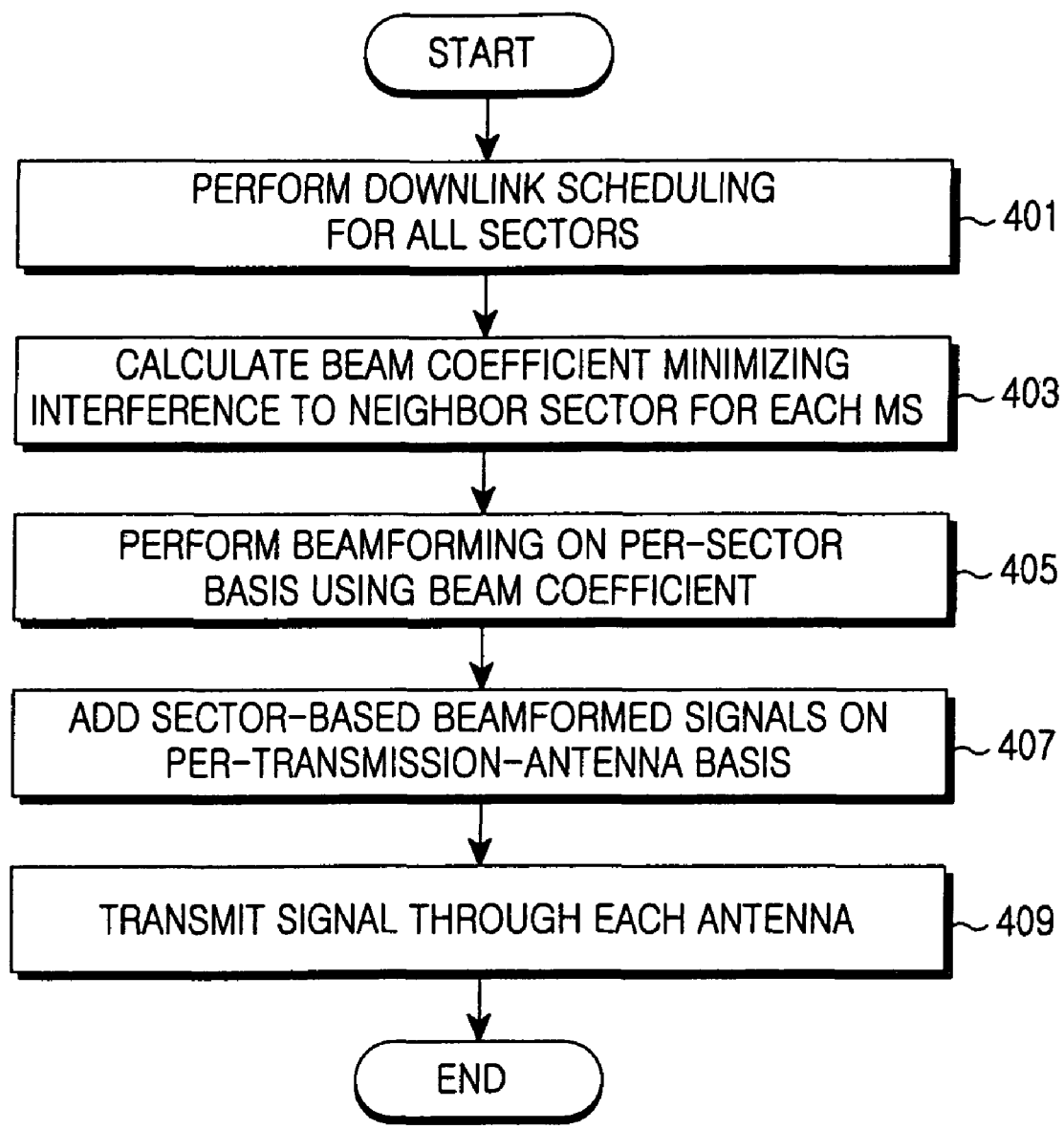
FIG. 4 is a flow diagram illustrating a beamforming process of a BS in a wireless communication system according to an exemplary embodiment of the present invention.

FIG. 4 is a flow diagram illustrating a beamforming process of a BS in a wireless communication system according to an exemplary embodiment of the present invention.

Referring to FIG. 4, the BS performs downlink scheduling for all sectors in step 401. That is, the BS performs scheduling for transmitting data to mobile stations without sector division.

Then, the BS calculates a beam coefficient minimizing interference to a neighbor sector for each MS in step 403. That is, the BS identifies sector-based mobile stations concurrently performing a communication with reference to the scheduling result of the step 401 and calculates beam coefficients so that signals transmitted to mobile stations located in different sectors do not interfere with each other. The beam coefficient is, for example, calculated as in Equation 2 above. The calculated beam coefficient is a vector having elements by the number of the total antennas of the BS.

Then, the BS performs beamforming on a per-sector basis using the calculated beam coefficient in step 405. That is, the BS multiplies the calculated beam coefficient by a signal to be transmitted to an MS within a corresponding sector.

Then, in step 407, the BS classifies the beamformed signals on a per-transmission-antennas basis and adds the signals of each sector on a per-transmission-antenna basis. In other words, the BS adds signals to be transmitted with the same transmission antenna among the beamformed signals, to each other.

Then, the BS amplifies the signals added on a per-transmission-antenna basis and transmits the amplified signals through a corresponding transmission antenna in step 409.

Figure 5A:
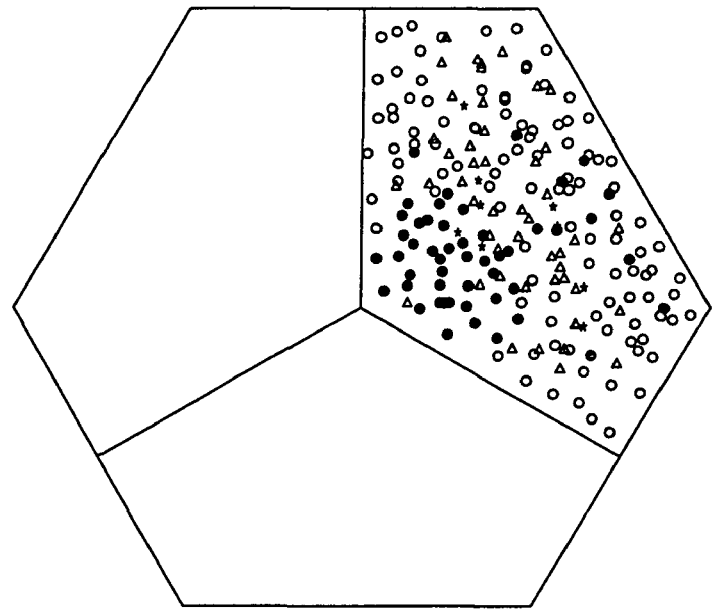
FIGS. 5A and 5B are diagrams illustrating a Carrier-to-Interference and Noise Ratio (CINR) distribution within a sector upon execution of beamforming according to the present invention.
Figure 5B:
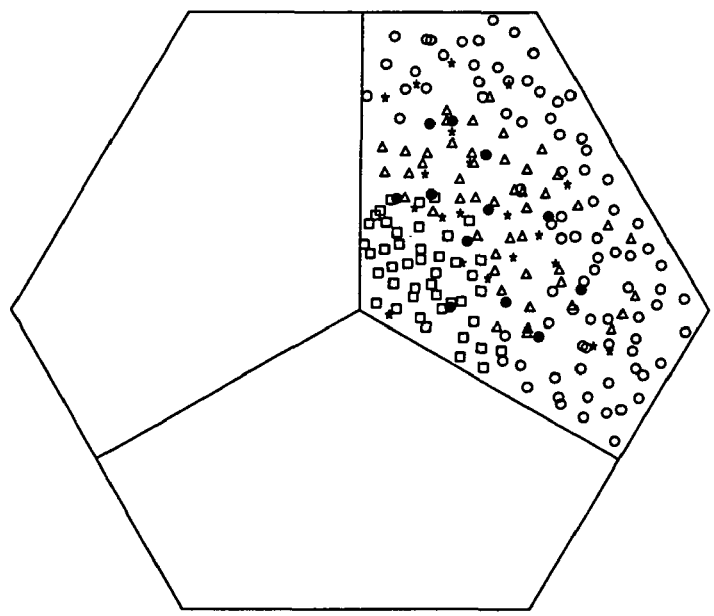

FIGS. 5A and 5B are diagrams illustrating a CINR distribution within a sector upon execution of beamforming according to the present invention. FIGS. 5A and 5B assume a BS including 6 antennas as shown in FIG. 2. FIG. 5A shows a CINR distribution when beamforming is performed on a per-sector basis using 2 antennas per sector. FIG. 5B shows a CINR distribution when beamforming is performed using all of 6 antennas of the BS according to the present invention. In comparison between FIGS. 5A and 5B, it can be identified that a CINR distribution is high generally if beamforming according to the present invention is performed. Especially, it can be identified that a high CINR of 25 dB or more appears conspicuously near a cell center.

Figure 6:
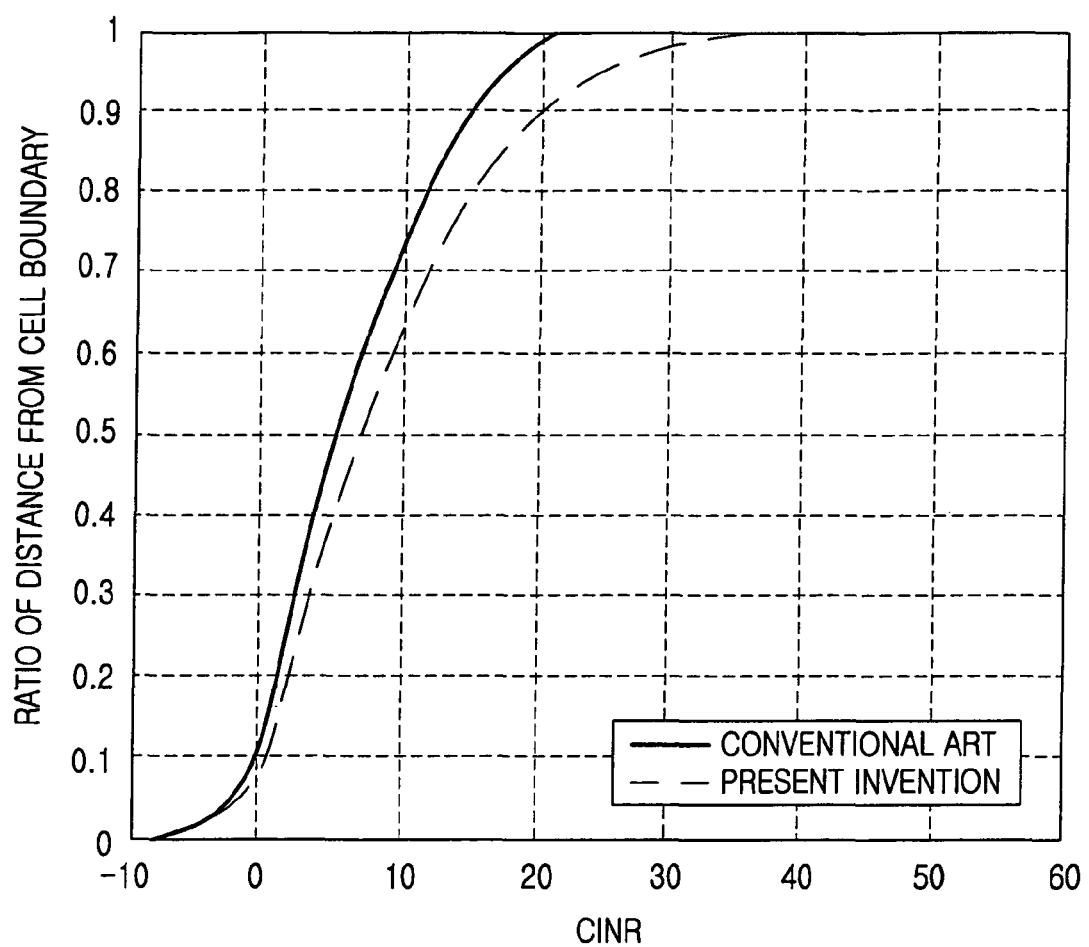
FIG. 6 is a graph showing performance of a beamforming scheme according to the present invention.

For more accurate performance comparison between the present invention and the conventional art, FIG. 6 shows, by a graph, the CINR distribution of FIGS. 5A and 5B. In FIG. 6, a horizontal axis represents a CINR and a vertical axis represents a ratio of a distance from a cell boundary. Regarding the vertical axis, '1' indicates a cell center. In FIG. 6, it can be identified that when beamforming according to the present invention is performed, an average CINR appears higher than that when conventional beamforming is performed in all positions within a sector.

As described above, the present invention shares antennas for all sectors in a wireless communication system and performs beamforming, thereby reducing the number of the total antennas of a BS, reducing system complexity, and increasing system capacity owing to beamforming with no inter-sector interference.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station (BS) apparatus having a plurality of antennas in a wireless communication system, the base station apparatus comprising:
a calculator configured to calculate beam coefficient vectors to be applied to transmission signals to mobile stations in a first sector of the BS considering an interference to at least one second sector of the BS that is a neighbor sector to the first sector;
a plurality of formers configured to perform beamforming for transmission signals to each mobile station within the first sector using the beam coefficient vectors, wherein each of a plurality of beamformed signals includes signals to be transmitted through transmission antennas of the first sector and signals to be transmitted through transmission antennas of the at least one second sector;
a plurality of adders configured to add signals to be transmitted through the same transmission antenna among sector-based beamformed signals; and
a scheduler configured to perform scheduling for the mobile stations without sector division and provide a scheduling result to a buffer, wherein the calculator is configured to receive the scheduling result from the buffer before calculating the beam coefficient vectors.

2. The base station apparatus of claim 1, wherein the former performs beamforming using a beam coefficient vector having elements corresponding to a total number of transmission antennas of the base station.

3. The base station apparatus of claim 2, wherein the calculator calculates beam coefficient vectors for each mobile station as in equation below:

$$W_\alpha = ((H_i^\alpha)^H H_i^\alpha + \sigma_\alpha^2 I)^{-1} (H_d^\alpha)^H$$

Here, $$H_d^\alpha = [h_d^{\alpha\ ant\ 1} \ldots h_d^{\alpha\ antN}]$$

$$H_i^\alpha = [h_i^{\alpha\ ant\ 1} \ldots h_i^{\alpha\ antN}]$$

where $h_i^{\alpha\ antN}$ is the interference channel for antenna N in sector $\alpha$, $H_d^{\alpha\ antN}$ is the channel for antenna N in sector $\alpha$, $\sigma_\alpha^2$ is the interference and noise power for sector $\alpha$, and I is a unit matrix.

4. The base station apparatus of claim 2, wherein the buffer is configured to store data to be transmitted to the mobile stations and output corresponding data to a coder.

5. The base station apparatus of claim 2, further comprising a plurality of amplifiers configured to amplify the signals added on a per-transmission-antenna basis and transmit the amplified signal through a corresponding antenna.

6. The base station apparatus of claim 3, wherein the former performs beamforming using a beam coefficient vector having elements corresponding to a total number of transmission antennas of the base station.

7. The base station apparatus of claim 1, further comprising a plurality of amplifiers configured to amplify the signals added on a per-transmission-antenna basis and transmit the amplified signal through a corresponding antenna.

8. A beamforming method of a base station (BS) in a wireless communication system, the method comprising:
calculating beam coefficient vectors to be applied to transmission signals to mobile stations in a first sector of the BS considering an interference to at least one second sector of the BS that is a neighbor sector to the first sector;
performing beamforming for the transmission signals to each mobile station within the first sector using the beam coefficient vectors, wherein each of a plurality of beamformed signals includes signals to be transmitted through transmission antennas of the first sector and signals to be transmitted through transmission antennas of the at least one second sector;
adding signals to be transmitted through the same transmission antenna among sector-based beamformed signals; and
performing scheduling, at a scheduler, for the mobile stations without sector division and providing a scheduling result to a buffer, wherein the scheduling result is received from the buffer before calculating the beam coefficient vectors.

9. The method of claim 8, wherein each beam coefficient vector includes elements corresponding to a total number of transmission antennas of the base station.

10. The method of claim 9, wherein the beam coefficient vectors are calculated as in the equation below:

$$W_\alpha = ((H_i^\alpha)^H H_i^\alpha + \sigma_\alpha^2 I)^{-1}(H_d^\alpha)^H$$

Here, $$H_d^\alpha = [h_d^{\alpha\, ant\, 1} \ldots h_d^{\alpha\, antN}]$$

$$H_i^\alpha = [h_i^{\alpha\, ant\, 1} \ldots h_i^{\alpha\, antN}]$$

where $h_i^{\alpha\, antN}$ is the interference channel for antenna N in sector $\alpha$, $H_d^{\alpha\, antN}$ is the channel for antenna N in sector $\alpha$, $\sigma_\alpha^2$ is the interference and noise power for sector $\alpha$, and I is a unit matrix.

11. The method of claim 9, wherein the buffer is configured to store data to be transmitted to the mobile stations and output corresponding data to a coder.

12. The method of claim 9, further comprising: amplifying the signals added on a per-transmission-antenna basis and transmitting the amplified signals through a corresponding antenna.

13. The method of claim 10, wherein each beam coefficient vector includes elements corresponding to a total number of transmission antennas of the base station.

14. The method of claim 8, further comprising: amplifying the signals added on a per-transmission-antenna basis and transmitting the amplified signals through a corresponding antenna.

15. A wireless communication network comprising a plurality of base station (BS) apparatuses, each of the base station apparatuses having a plurality of antennas and comprising:
   a calculator configured to calculate beam coefficient vectors to be applied to transmission signals to mobile stations in a first sector of the BS considering an interference to at least one second sector of the BS that is a neighbor sector to the first sector;
   a plurality of formers configured to perform beamforming for one of the transmission signals to each mobile station within the first sector using the beam coefficient vectors, wherein each of a plurality of beamformed signals includes signals to be transmitted through transmission antennas of the first sector and signals to be transmitted through transmission antennas of the at least one second sector;
   a plurality of adders configured to add signals to be transmitted through the same transmission antenna among sector-based beamformed signals; and
   a scheduler configured to perform scheduling for the mobile stations without sector division and provide a scheduling result to a buffer, wherein the calculator is configured to receive the scheduling result from the buffer before calculating the beam coefficient vectors.

16. The wireless communication network of claim 15, wherein the former performs beamforming using a beam coefficient vector having elements corresponding to a total number of transmission antennas of the base station.

17. The wireless communication network of claim 16, wherein the calculator calculates the beam coefficient vectors for each mobile station as in the equation below:

$$W_\alpha = ((H_i^\alpha)^H H_i^\alpha + \sigma_\alpha^2 I)^{-1}(H_d^\alpha)^H$$

Here, $$H_d^\alpha = [h_d^{\alpha\, ant\, 1} \ldots h_d^{\alpha\, antN}]$$

$$H_i^\alpha = [h_i^{\alpha\, ant\, 1} \ldots h_i^{\alpha\, antN}]$$

where $h_i^{\alpha\, antN}$ is the interference channel for antenna N in sector $\alpha$, $H_d^{\alpha\, antN}$ is the channel for antenna N in sector $\alpha$, $\sigma_\alpha^2$ is the interference and noise power for sector $\alpha$, and I is a unit matrix.

18. The wireless communication network of claim 16, wherein the buffer is configured to store data to be transmitted to the mobile stations and output corresponding data to a coder.

19. The wireless communication network of claim 17, wherein the former performs beamforming using a beam coefficient vector having elements corresponding to a total number of transmission antennas of the base station.

20. The wireless communication network of claim 15, further comprising:
   a plurality of amplifiers configured to amplify the signal added on a per-transmission-antenna basis and transmitting the amplified signal through a corresponding antenna.

* * * * *